United States Patent
Pajevic et al.

(10) Patent No.: US 12,030,360 B2
(45) Date of Patent: *Jul. 9, 2024

(54) MOBILE DRIVE UNIT HAVING A SPLIT CHASSIS

(71) Applicant: Amazon Technologies, Inc., Seattle, WA (US)

(72) Inventors: Dragan Pajevic, Arlington, MA (US); Peter Thomas Colantonio, North Andover, MA (US)

(73) Assignee: Amazon Technologies, Inc., Seattle, WA (US)

(*) Notice: Subject to any disclaimer, the term of this patent is extended or adjusted under 35 U.S.C. 154(b) by 451 days.

This patent is subject to a terminal disclaimer.

(21) Appl. No.: 17/306,827

(22) Filed: May 3, 2021

(65) Prior Publication Data

US 2021/0276387 A1  Sep. 9, 2021

Related U.S. Application Data

(63) Continuation of application No. 15/934,507, filed on Mar. 23, 2018, now Pat. No. 11,001,117.

(51) Int. Cl.
| | | |
|---|---|---|
| *B60G 17/0195* | (2006.01) | |
| *B60D 1/46* | (2006.01) | |
| *B60G 7/00* | (2006.01) | |
| *B60P 1/64* | (2006.01) | |
| *B62D 21/18* | (2006.01) | |
| *B62D 61/04* | (2006.01) | |
| *G05D 1/00* | (2006.01) | |

(52) U.S. Cl.
CPC ........... *B60G 17/0195* (2013.01); *B60D 1/46* (2013.01); *B60G 7/003* (2013.01); *B60P 1/6445* (2013.01); *B62D 21/18* (2013.01); *B62D 61/04* (2013.01); *G05D 1/0227* (2013.01); *B60G 2206/011* (2013.01); *B60G 2800/91* (2013.01)

(58) Field of Classification Search
CPC ............... B60G 7/003; B60G 17/0195; B60G 2206/011; B60G 2800/91; B60P 1/6445; B62D 1/28; B62D 1/283; B62D 21/18; B62D 61/04; B60D 1/46; G05D 1/0227
See application file for complete search history.

(56) References Cited

U.S. PATENT DOCUMENTS 1,433,957 A * 10/1922 Laidlaw ................. A47L 11/33
                                                              15/179
3,520,378 A    7/1970 Slay
(Continued)

FOREIGN PATENT DOCUMENTS

EP    3281848 A1    2/2018
FR    2342197 A1    9/1977
(Continued)

OTHER PUBLICATIONS

International Patent Application No. PCT/US2019/023752; Int'l Search Report and the Written Opinion; dated Jun. 21, 2019; 14 pages.
(Continued)

*Primary Examiner* — Kevin Hurley
(74) *Attorney, Agent, or Firm* — BakerHostetler

(57) ABSTRACT

A mobile drive unit includes a pivot between the front chassis unit and the rear chassis unit, thereby diminishing the total height of the unit.

20 Claims, 5 Drawing Sheets

(56) References Cited

U.S. PATENT DOCUMENTS

| | | | |
|---|---|---|---|
| 3,709,313 A | 1/1973 | James | |
| 4,128,137 A | 12/1978 | Booth | |
| 4,245,847 A | 1/1981 | Knott | |
| 4,310,167 A | 1/1982 | McLaurin | |
| 4,515,235 A | 5/1985 | Yamamoto et al. | |
| 5,036,935 A | 8/1991 | Kohara | |
| 5,435,404 A | 7/1995 | Garin, III | |
| 5,630,607 A | 5/1997 | Yancer | |
| 5,696,675 A * | 12/1997 | Nakamura | G05D 1/0219 701/25 |
| 5,901,805 A | 5/1999 | Murakami et al. | |
| 6,196,343 B1 | 3/2001 | Strautnieks | |
| 6,206,119 B1 | 3/2001 | Wu | |
| 6,454,286 B1 | 9/2002 | Hosino | |
| 6,494,474 B1 | 12/2002 | Kramer, Jr. | |
| 7,293,801 B2 | 11/2007 | Bertrand et al. | |
| 7,735,591 B2 | 6/2010 | Puskar-Pasewicz et al. | |
| 7,775,307 B2 | 8/2010 | Cheng | |
| 7,828,310 B2 | 11/2010 | Vreeswijk et al. | |
| 8,113,531 B2 | 2/2012 | Zhou | |
| 8,918,202 B2 | 12/2014 | Kawano | |
| 9,152,149 B1 | 10/2015 | Palamarchuk et al. | |
| 9,308,143 B2 | 4/2016 | Bekoscke et al. | |
| 2003/0020261 A1 | 1/2003 | Perelli et al. | |
| 2003/0106731 A1 | 6/2003 | Marino et al. | |
| 2004/0093116 A1 | 5/2004 | Mountz | |
| 2005/0077715 A1 | 4/2005 | Mulhern et al. | |
| 2007/0016328 A1 * | 1/2007 | Ziegler | A47L 9/009 701/23 |
| 2007/0018418 A1 | 1/2007 | Huang | |
| 2007/0080510 A1 | 4/2007 | Ji | |
| 2014/0228999 A1 | 8/2014 | D'Andrea et al. | |
| 2017/0015168 A1 | 1/2017 | Estier | |
| 2017/0340942 A1 | 11/2017 | Connell et al. | |
| 2018/0072355 A1 | 3/2018 | Sakashita et al. | |
| 2019/0155296 A1 | 5/2019 | Moore et al. | |
| 2019/0161274 A1 | 5/2019 | Paschall, II et al. | |
| 2019/0291956 A1 | 9/2019 | Pajevic et al. | |
| 2019/0294175 A1 | 9/2019 | Pajevic et al. | |

FOREIGN PATENT DOCUMENTS

| | | |
|---|---|---|
| GB | 2372485 A | 8/2002 |
| JP | 2012-228996 A | 11/2012 |

OTHER PUBLICATIONS

International Patent Application No. PCT/US2019/023752; Int'l Preliminary Report on Patentability; dated Oct. 8, 2020; 8 pages.

* cited by examiner

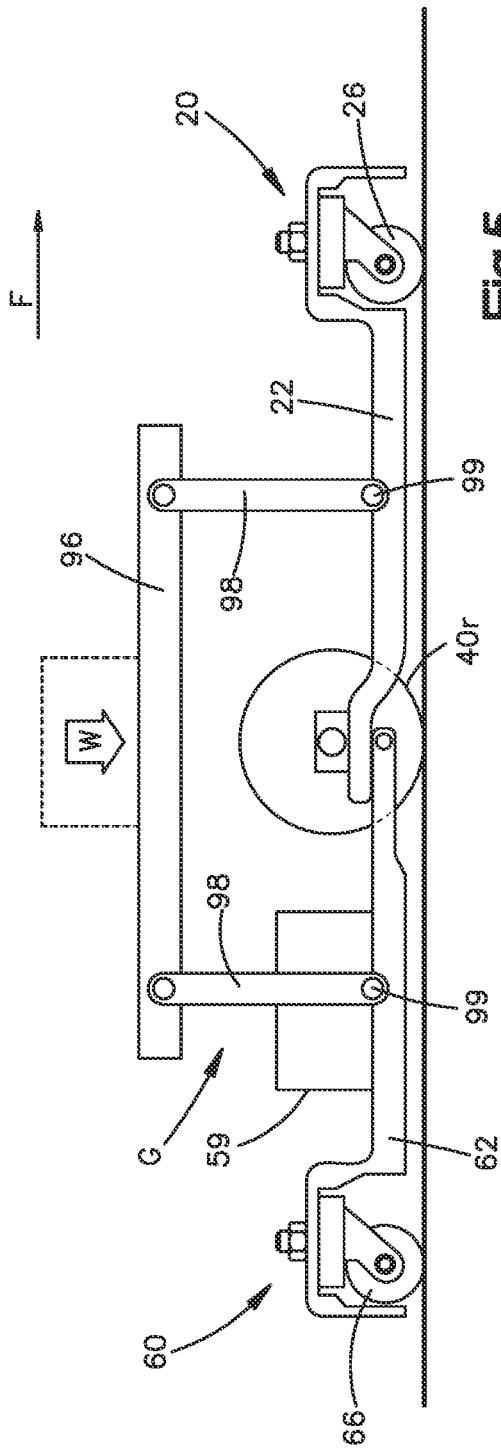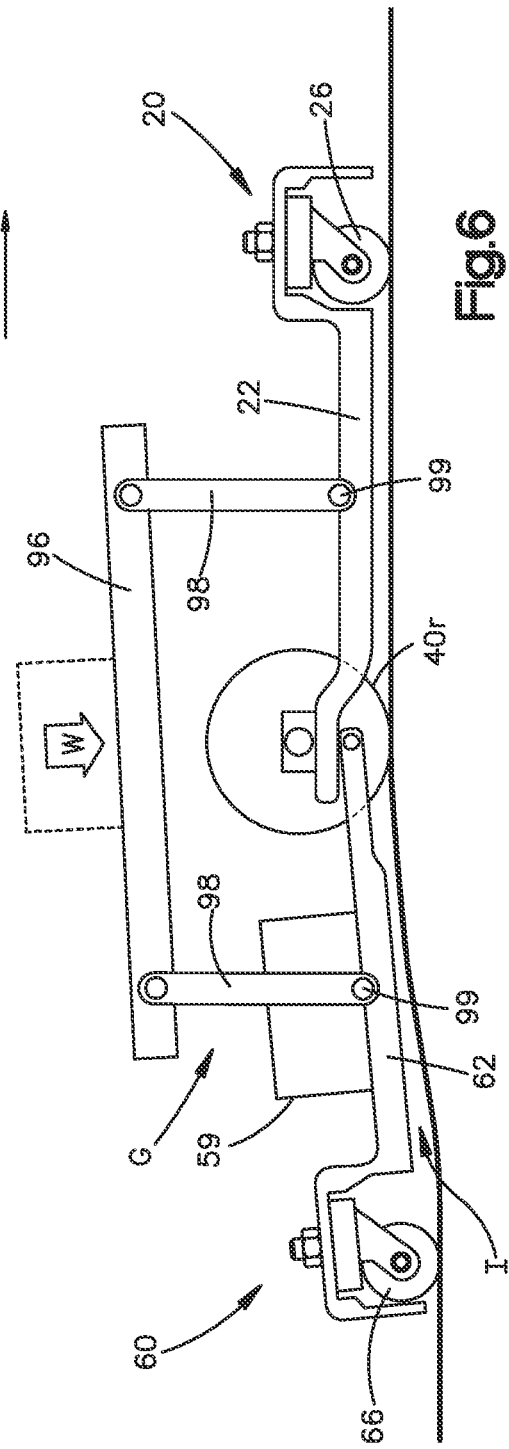

MOBILE DRIVE UNIT HAVING A SPLIT CHASSIS

BACKGROUND

The invention relates to robotic devices and methods, and more particularly to mobile drive units.

Movement of products in a modern warehouse environment, such as a fulfilment center, occurs on a vast scale. One means for managing order fulfillment is to house the products in free-standing shelving units, referred to as pods, and to transport the pods using mobile drive units. Some mobile drive units are self-powered robotic devices that travel on the floor of the warehouse guided by fiducial markers in or on the floor. The mobile drive units move beneath desired pods, lifts the pod from the floor, and transport the pods to desired locations.

One type of mobile drive unit that has been in commercial use employs a one-piece chassis having a pair of motorized midwheels, a pair of front caster wheels, and a pair of rear caster wheels, which are attached to the chassis by a suspension arm. For each of the front caster wheels and the rear caster wheels in some prior art units, the left and right caster wheels are mounted on a common shaft and spaced apart such that the left and right wheels straddle the longitudinal centerline of the mobile drive unit.

Increasing storage density enables fulfillment centers to increase the quantity, and potentially diversity of products stored, which typically leads to an enhanced consumer experience. The total height of the mobile drive unit is important variable in effectively managing storage density. Specifically, as the height of the mobile drive unit uses vertical space that could otherwise be used by pods to hold products. Further, it is common for warehouse concrete floor to have irregularities, such as expansion joints or dips inherent in building process or caused by floor wear or damage.

BRIEF DESCRIPTION OF THE DRAWINGS

FIG. 5 is a schematic view of a cross section of the chassis of FIG. 1; and

FIG. 6 is another view of the chassis of FIG. 5 illustrating operation of the chassis upon encountering an irregularity in the floor.

DETAILED DESCRIPTION OF ILLUSTRATIVE EMBODIMENTS

The following disclosure relates to solutions to problems arising from or relating (at least in part) to achieving a short mobile drive unit. One type of exemplary mobile drive unit employs a one-piece chassis having a pair of motorized midwheels, a pair of front caster wheels, and a pair of rear caster wheels, which are attached to the chassis by a suspension arm. The front caster wheels and rear caster wheels are aligned along a longitudinal centerline of the mobile drive unit. Both the front and rear have a pair of casters that are closely connected by a common arm that may cause instability or rocking during operation.

A mobile drive unit 8 configured for use in inventory fulfillment includes a chassis. The chassis described herein includes a front chassis unit and a rear chassis unit that are hinged together such that upon encountering a floor irregularity, the front and/or rear chassis can move about a pivot. The pivoting feature of the chassis enables the overall height of the mobile drive unit to have a diminished height compared with prior generations of similar mobile drive units.

Figure 1:
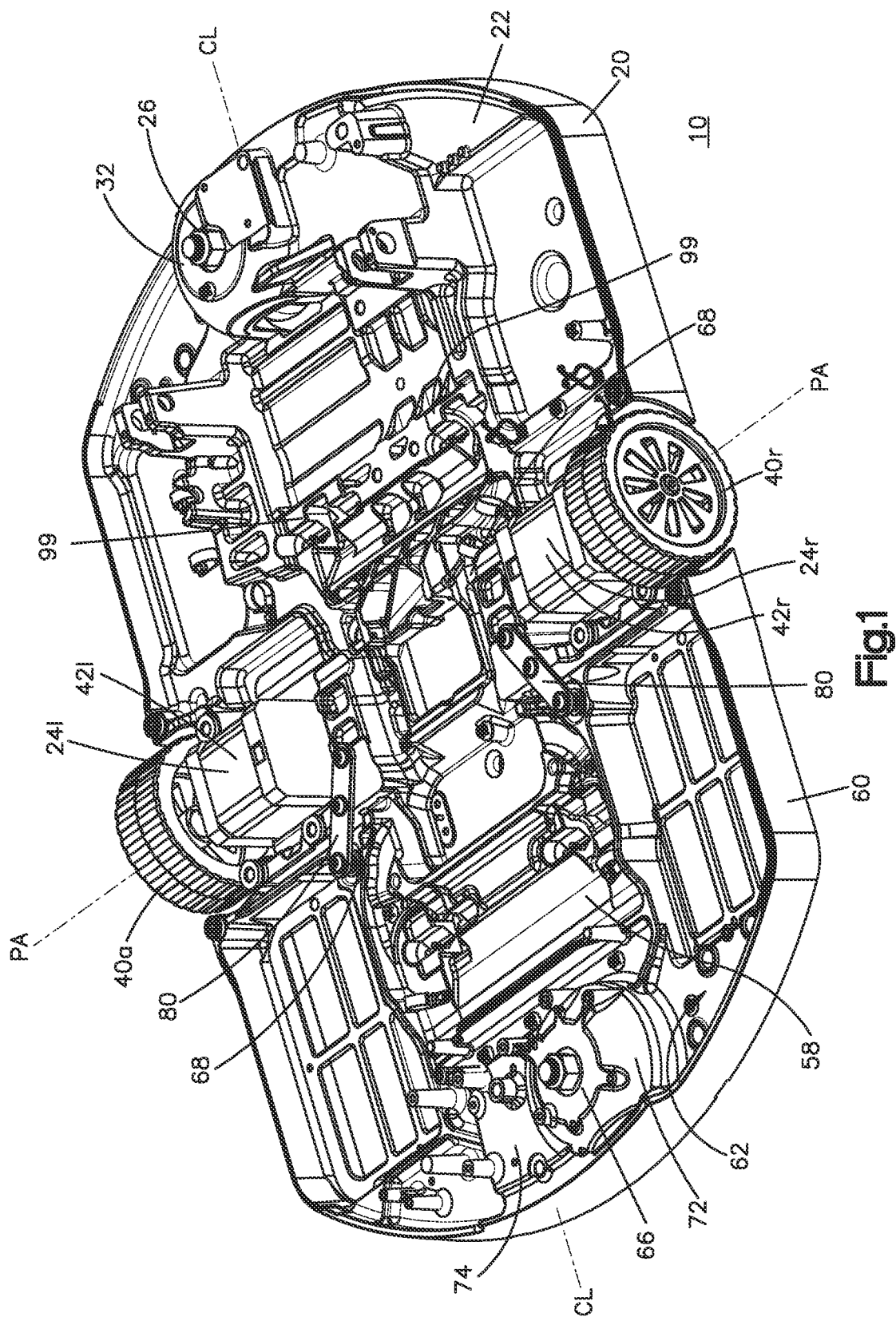
FIG. 1 is a perspective view illustrating a hinged chassis configuration.
Figure 2:
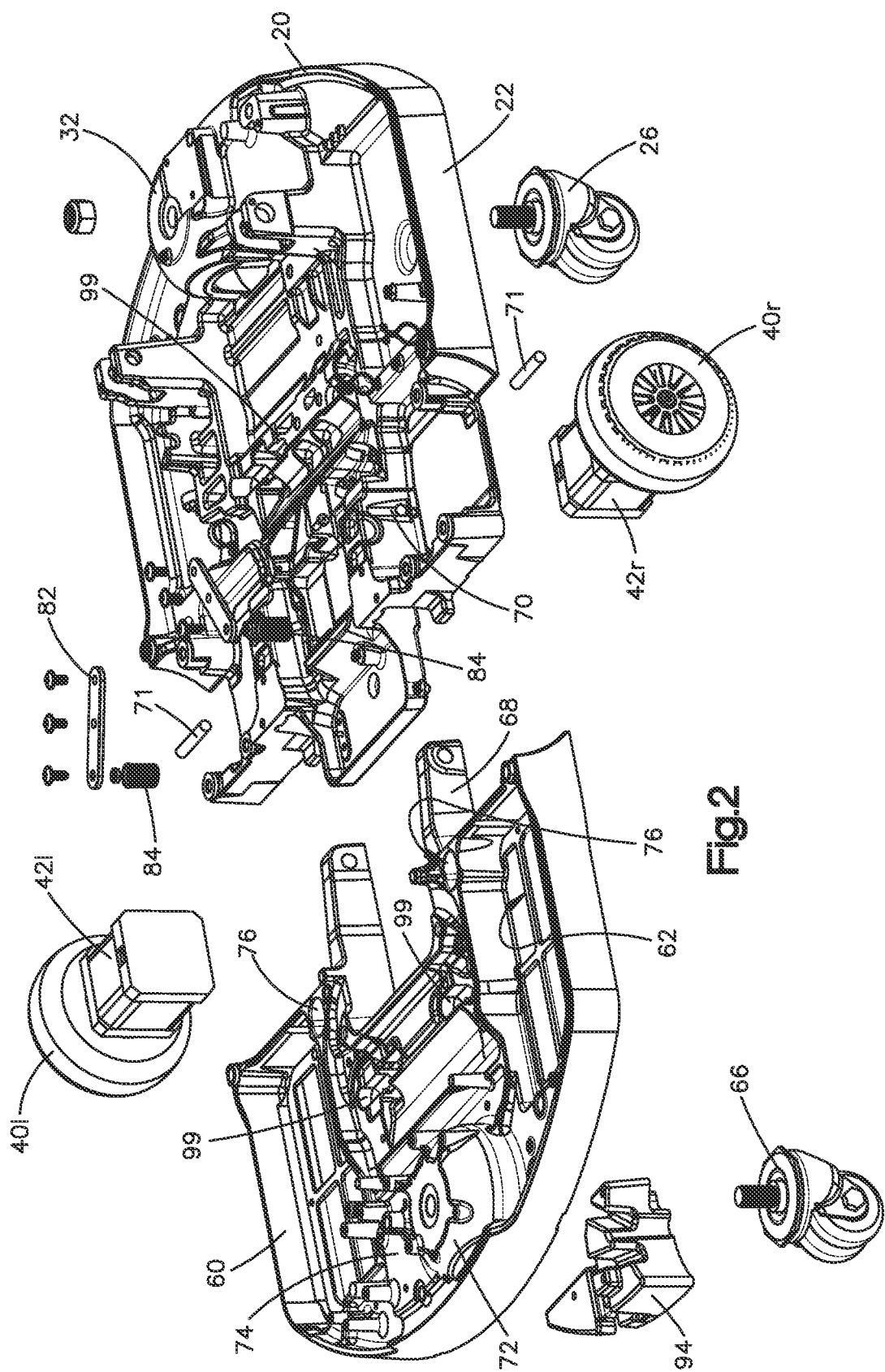
FIG. 2 is an exploded view of the chassis of FIG. 1.
Figure 3:
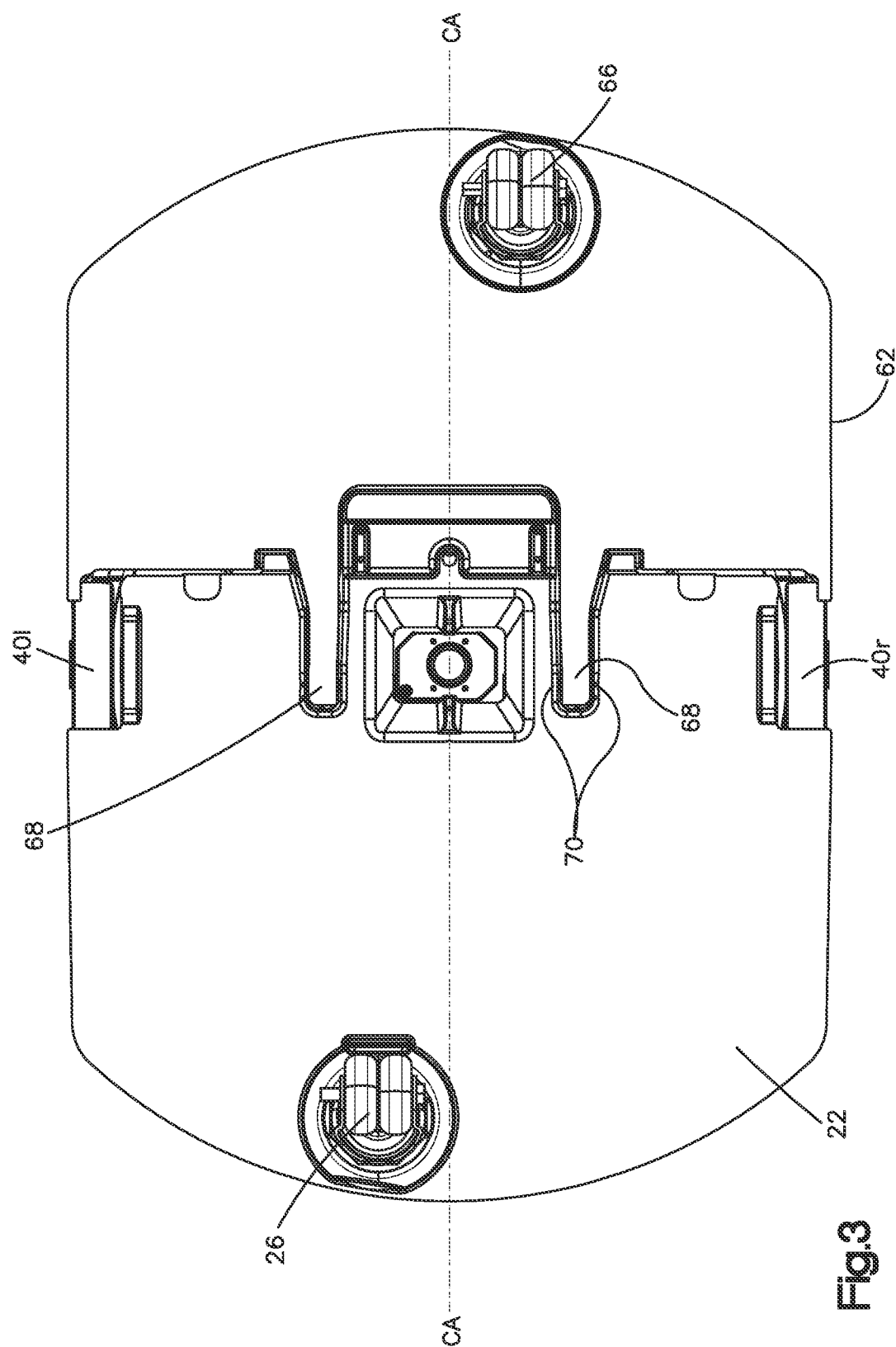
FIG. 3 is a bottom view of the chassis of FIG. 1.

Referring FIGS. 1-3, a chassis 10 of a mobile drive unit includes a first chassis assembly, such as front chassis assembly or unit 20, and a second chassis assembly, such as rear chassis assembly or unit 60. Front chassis assembly 20 includes a base 22, a pair of motorized wheel assemblies 24L and 24R, and a front caster 26. Base 22 in the embodiment shown in the figures is a one-piece aluminum casting to which the wheel assemblies 24L and 24R and front caster 26 are mounted. Base 22 includes mounts and cut outs for receiving the wheel assemblies 24L and 24R, and includes a recess for mounting front caster 26. Base 22 also includes a pair of pivot mounts 70, as explained more fully below.

Rear chassis assembly 60 includes a base 62 and rear caster 66. Base 62 preferably is a one-piece aluminum casting that includes a recess for mounting rear caster 66 and an underside recess (shown from the top as reference number 74 in FIG. 2) for mounting a ballast 94. Base 62 may also include a mount 58 for batteries. FIG. 3 illustrates aspects of the split chassis and the relationship of the caster wheels, and omits other features, such as ballast 94.

Rear chassis assembly 60 includes a pair of forward-extending arms 68 that engage pivot mounts 70 of front base 22. A pair of pins 71 (FIG. 2) link arms 68 to mounts 70 to enable front base 22 and rear base 62 to pivot relative to each other. Pins 71 define a chassis pivot axis PA (FIG. 1) about which bases 22 and 62 pivot or rotate as needed. Axis PA is horizontal and transverse. Axis PA is also perpendicular to a direction of forward motion, which is illustrated in FIG. 1 by line CL, as in the embodiment shown the direction of forward motion is parallel to the centerline CL of MDU 8. Centerline CL bisects the bases 22 and 62 and is equidistant between the drive wheel assemblies 24L and 24R.

Casters 26 and 66 are mounted to base 22 and 62 (respectively)—the caster shafts extend through the base and are affixed by bolts. Preferably, casters 26 and 66 are conventional, and may include double wheels. Casters 26 and 66 freely pivot about the vertical axis through the shafts and are not driven. Casters 26 and 66 are asymmetrically and laterally offset from centerline CL. In the embodiment shown in the figures, front caster 26 is spaced apart from centerline CL to the left and rear caster 66 is spaced apart from centerline CL to the right. The offset spacing enables the drive unit 8 to pass over a fiducial marker, such as a bar code or 3D code, in the floor without any of the wheels contacting the marker. Thus, the centerline CL of MDU 8 passes directly over a fiducial marker when the unit 8 drives forward.

Each motor assembly 24L and 24R includes a conventional motor 42L and 42R (as will be understood by persons familiar with mobile drive unit technology) and a drive wheel 40L and 40R, respectively. Wheels 40L and 40R are approximately at the midpoint (fore and aft) of mobile drive unit 8. Each wheel 40L and 40R may be driven according to control signals to move the unit 8 forward, or a direction of one of the wheels can be reversed such that the drive unit 8 can rotate in place.

A pair of spring assemblies 80 have the function of transmitting a downward force on each one of the front caster 26 and rear caster 66, and thus spring assemblies 80 diminish the downward force on drive wheels 40L and 40R. Each spring assembly 80 includes a bracket 82 that is affixed to a rear portion of front chassis base 22 and extends rearwardly to a front portion of rear chassis base 62. Spring assembly 80 includes a compression spring 84 that is located in a pocket 76 formed in rear base 62. Compression spring 84 includes an adjusting bolt that enables spring 84 a pre-load force to be set.

Figure 4:
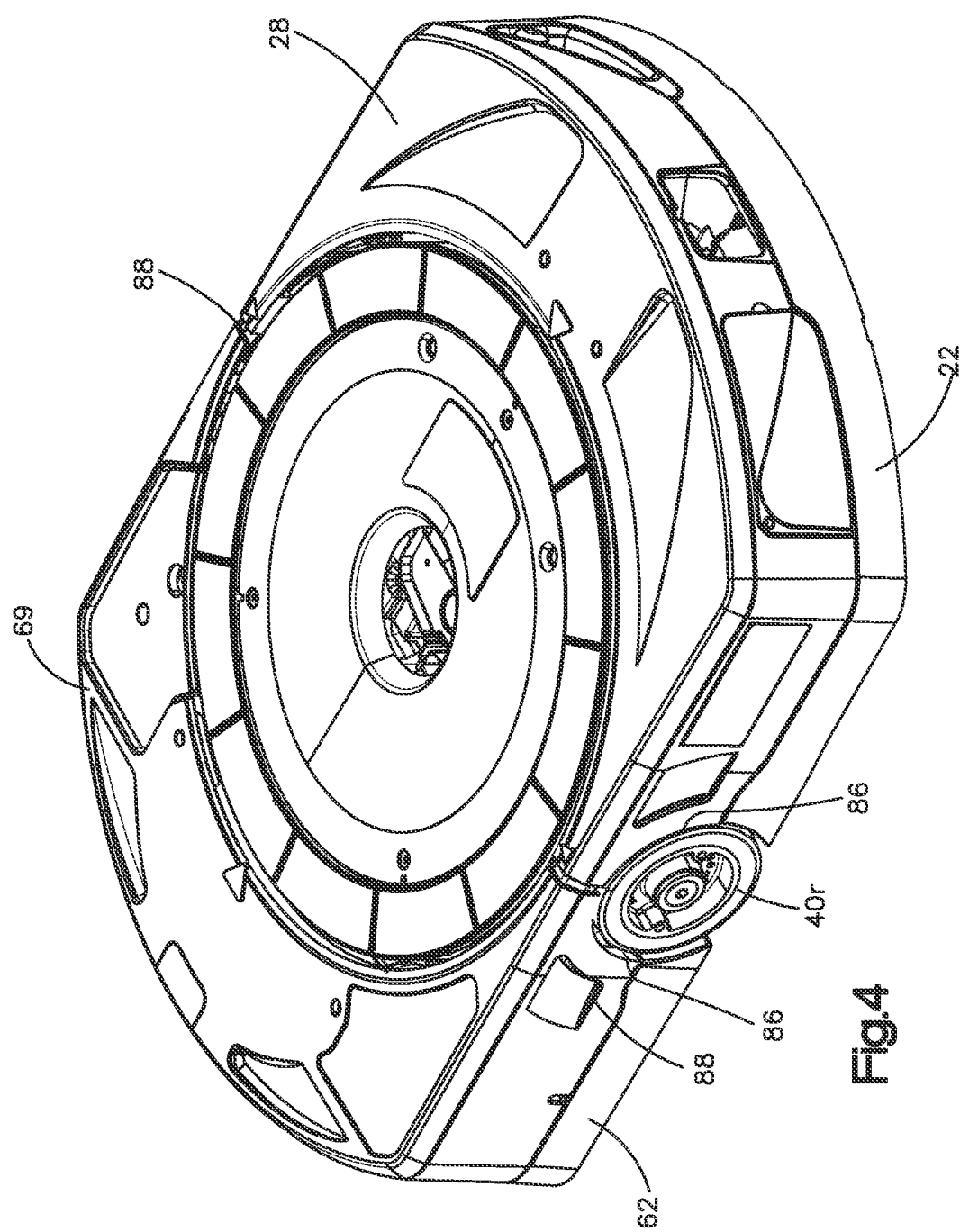
FIG. 4 is a perspective view of a chassis including a cover.

Referring to FIG. 4, mobile drive unit 8 can include a front cover 28 that is affixed to front base 22 and a rear cover 69 that is affixed to rear base 62. Each cover 28 and 69 have a cut-out portion that, with the corresponding cut-outs in bases 22 and 62, forms wheel cut-out that wheels 40L/40R extend through. In this regard, wheels 40L and 40R may extend laterally to the outboard sides of the mobile drive unit.

Each one of front base 22 and rear base 62 includes a support structure or mounts 99 for mounting a support structure 98, as explained below and shown schematically in FIGS. 5 and 6. Mounts 99 may have any configuration and supports that connect to mounts 99 may take any configuration, as mounts 99 encompass (without limitation) pivots and fixed structure.

FIG. 5 schematically illustrates front chassis unit 20 and rear chassis unit 60 carrying a load W on a top structure 96. Top structure 96 can be any structure, such as a turntable shown in FIG. 4, or any other structure without limitation. Accordingly, top structure supports 98 may be any configuration and are shown only for illustration, as will be understood and can be implemented by persons familiar with mobile drive unit technology and depending on the particular parameters of the application.

A component, such as a battery pack 59, is mounted to rear base 62 to illustrate the operation of the mobile drive unit 8 (FIGS. 5 and 6). In this regard, component/battery 59 is employed to illustrate the gap between the components of mounted on the rear chassis base 62 of the mobile drive unit 8 and the top structure 96, which gap is required to avoid damage to the components. Thus, FIG. 5 illustrates the unit on a flat surface such that top structure 96 is spaced apart from component 59 to form a gap G.

Upon receiving a drive signal from the controls to drive forward, motors 42L and 42R provide torque to wheels 40L and 40R. Upon encountering an irregularity, such a bump I, as illustrated in FIG. 6, rear chassis unit 60 follows front chassis unit 20 over irregularity I such that rear chassis unit 60 pivots relative to front chassis unit 20. Clearance gap G is maintained.

The pivoting relationship is distinguished from prior mobile drive units, in which component 59 (or the highest vertical component on the rear unit) was affixed to an extension of the front chassis such that encountering the irregularity I shown in FIG. 6 eliminated gap G, enabling the top structure to contact the components. To prevent the contact between the top structure and the components, prior art mobile drive units where configured with a greater gap and therefore an overall greater height compared with the mobile drive unit 8. In this regard, in the embodiment shown, both the highest vertical component mounted and the support structure 98 for the top structure are located on the rear chassis unit base 62.

The structure described herein enables a lower overall height. Prior mobile drive units had a total height of 10 inches or greater. Mobile drive unit 8 has a total height of 7.785 inches.

The mobile drive unit includes controllers, cameras and other sensors, a docking port, a turntable, motors to lift and rotate the turntable, and the other components. A person familiar with mobile drive unit technology will understand how to mount and employ the additional components to the front and rear chassis units disclosed herein according to the particular goals and design of the mobile drive unit application.

The present invention has been described by employing a particular embodiment to illustrate particular features. For merely one non-limiting example, components are referred to as front and rear in order to illustrate the structure and function, but the invention is not limited to the particular front and rear orientations unless expressly stated in the claims. Further, the present invention is not limited to any structure or function, nor is the invention limited to any solution to any problem, described herein unless expressly stated in the claims. Nor is the invention limited in any way to embodying a benefit unless expressly stated in the claims. Rather, the structure and function described herein is merely an illustration, and the claims are intended to receive their full scope.

What is claimed is:

1. A low profile robotic assembly comprising:
a chassis assembly comprising a front chassis portion and a rear chassis portion;
a pair of wheels coupled to the chassis assembly proximate a mid-point of the chassis assembly;
a power source coupled to the chassis, the power source providing driving power to at least one of the pair of wheels;
a front caster mounted to the front chassis portion; a rear caster mounted to the rear chassis portion;
a connection between the rear chassis portion and the front chassis portion allowing the front chassis portion and the rear chassis portion to move independently; and
the front caster and the rear caster being mounted proximate a driving-direction centerline of the chassis assembly, wherein at least one of the front caster and the rear caster is asymmetrically offset from the driving-direction centerline.

2. The robotic assembly as recited in claim 1 further comprising a motor coupled to each of the pair of wheels proximate the mid-point and wherein each motor is separately controllable.

3. The robotic assembly as recited in claim 1, is less than about ten inches in height.

4. The robotic assembly as recited in claim 1 comprising a top structure mounted to the chassis assembly and forming a support structure above the chassis assembly proximate a mid-point of the chassis assembly configured to carry a load.

5. The robotic assembly as recited in claim 4, wherein the top structure is pivotally mounted to chassis.

6. The robotic assembly as recited in claim 4, wherein the support structure comprises a turntable.

7. The robotic assembly as recited in claim 1 comprising a front cover unit affixed to the front chassis unit and a rear cover unit affixed to the rear chassis unit, the front cover unit and rear cover unit being spaced apart to enable pivoting of the front chassis unit relative to the rear chassis unit.

8. A mobile drive unit comprising:
a chassis assembly comprising a first chassis part and a second chassis part; a power source coupled to the chassis assembly;
at least two wheels coupled to the chassis proximate a mid-point of the chassis assembly; a power source driving power to at least one of the at least two wheels;
a first wheel pivotally mounted to the first chassis part;
a second wheel pivotally mounted to the second chassis part;

wherein the first chassis part is movably coupled to the second chassis part allowing the first chassis part and the second chassis part to move relative to each other; and wherein the first wheel and the second wheel are pivotally mounted proximate a driving-direction centerline of the chassis assembly, wherein at least one of the first wheel and the second wheel is offset from the driving-direction centerline.

9. The robotic assembly as recited in claim 8, is less than about eight inches in height.

10. The robotic assembly as recited in claim 8 comprising a top structure movably mounted to the chassis assembly and forming a support structure configured to carry a load above the chassis assembly.

11. The robotic assembly as recited in claim 10, wherein the top structure is pivotally mounted to chassis.

12. The robotic assembly as recited in claim 10, wherein the support structure comprises a turntable.

13. The robotic assembly as recited in claim 12 further comprising a motor configured to lift the turntable.

14. The robotic assembly as recited in claim 8 wherein at least one of the first wheel or the second wheel is recessed into the first chassis part or second chassis part.

15. The robotic assembly as recited in claim 8 wherein at least one of the first chassis part or the second chassis part is formed from a metal casting.

16. A robotic assembly comprising:
a chassis assembly comprising a front chassis portion and a rear chassis portion;
a pair of wheels coupled to the chassis assembly;
a front caster mounted to the front chassis portion; a rear caster mounted to the rear chassis portion;
the rear chassis portion and the front chassis portion pivotally coupled to each other proximate a mid-point of the chassis; and
a movably mounted support structure configured to carry a weighted object over and spaced apart from a top of the chassis assembly wherein the support structure moves relative to the chassis assembly when the rear chassis and front chassis pivot relative to each other, wherein the movably mounted support structure configured to carry a weight object has a first substantially flat surface, the flat surface being a vertically highest surface of the robotic assembly.

17. The robotic assembly as recited in claim 16 wherein the distance between the support structure and the chassis assembly provides space for mounting of components between the support structure and the chassis, wherein the space for mounting components comprises space below the top surface of the pair of wheels.

18. The robotic assembly as recited in claim 17 wherein the components comprise a battery.

19. The robotic assembly as recited in claim 16 wherein the bottom surface of at least one of the front chassis portion and rear chassis portion is a second substantially flat surface enclosing a bottom of the space for mounting components.

20. The robotic assembly as recited in claim 16 wherein the top surface comprises a turntable.

* * * * *